United States Patent
Kobayashi et al.

(10) Patent No.: US 9,688,280 B2
(45) Date of Patent: Jun. 27, 2017

(54) TRACTION CONTROL DEVICE

(71) Applicant: Mitsubishi Electric Corporation, Tokyo (JP)

(72) Inventors: Hiroyuki Kobayashi, Hyogo (JP); Masahiro Iezawa, Tokyo (JP); Keiichi Enoki, Tokyo (JP); Nobuhide Mori, Tokyo (JP); Yasufumi Ogawa, Tokyo (JP); Kotaro Nakano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/906,296

(22) PCT Filed: Oct. 31, 2013

(86) PCT No.: PCT/JP2013/079536
§ 371 (c)(1),
(2) Date: Jan. 20, 2016

(87) PCT Pub. No.: WO2015/063913
PCT Pub. Date: May 7, 2015

(65) Prior Publication Data
US 2016/0167662 A1    Jun. 16, 2016

(51) Int. Cl.
*B60T 7/12*   (2006.01)
*B60W 30/18*   (2012.01)
(Continued)

(52) U.S. Cl.
CPC ....... *B60W 30/18172* (2013.01); *B60L 3/102* (2013.01); *B60L 15/20* (2013.01);
(Continued)

(58) Field of Classification Search
CPC ...................... B60W 30/18172; B60W 40/068
(Continued)

(56) References Cited

U.S. PATENT DOCUMENTS 8,244,445 B2 *   8/2012 Luehrsen ............... B60K 28/16
                                                                         180/197
2008/0105479 A1 *   5/2008 Nishiike ................ B60K 28/16
                                                                         180/197
(Continued)

FOREIGN PATENT DOCUMENTS

JP    7-112634 A    5/1995
JP    8-182119 A    7/1996
(Continued)

OTHER PUBLICATIONS

International Search Report for PCT/JP2013/079536 dated Jan. 28, 2014.

*Primary Examiner* — Thomas G Black
*Assistant Examiner* — Luke Huynh
(74) *Attorney, Agent, or Firm* — Sughrue Mion, PLLC; Richard C. Turner

(57) ABSTRACT

In order to provide a traction control device capable of preventing an initial slip at a start, the traction control device includes a drive power source outputting drive power to a drive wheel of a vehicle; a vehicle speed sensor detecting the wheel speed of a non-drive wheel of the vehicle; and target restricted speed generating means for generating a target restricted speed for the vehicle by determining the state of a road surface from target drive torque of the vehicle, the wheel speed of the non-drive wheel, and a signal indicating the extent of operation of an accelerator by a driver. The target restricted speed generated by the target restricted speed generating means is switched stepwise in a speed region where the speed of the drive wheel is not detected in correspondence with a control mode that is classified according to the slipperiness of a road surface.

12 Claims, 11 Drawing Sheets

(51) Int. Cl.
*B60L 15/20* (2006.01)
*B60W 40/068* (2012.01)
*B60L 3/10* (2006.01)

(52) U.S. Cl.
CPC ........ *B60W 40/068* (2013.01); *B60L 2240/12* (2013.01); *B60L 2240/423* (2013.01); *B60L 2240/461* (2013.01); *B60L 2240/642* (2013.01); *B60L 2240/647* (2013.01); *Y02T 10/7275* (2013.01)

(58) Field of Classification Search
USPC ........................................ 701/90, 82, 84, 91
See application file for complete search history.

(56) References Cited

U.S. PATENT DOCUMENTS

| | | | | |
|---|---|---|---|---|
| 2012/0053789 | A1* | 3/2012 | Noumura | B60W 10/04 701/37 |
| 2012/0279793 | A1 | 11/2012 | Kikuchi et al. | |
| 2015/0060173 | A1* | 3/2015 | Okubo | B60K 6/445 180/197 |
| 2015/0203117 | A1* | 7/2015 | Kelly | B60K 31/02 701/91 |

FOREIGN PATENT DOCUMENTS

| | | |
|---|---|---|
| JP | 2006-129584 A | 5/2006 |
| JP | 2009-284702 A | 12/2009 |
| JP | 2011-184013 A | 9/2011 |
| WO | 2011/089830 A1 | 7/2011 |
| WO | 2013/024871 A1 | 2/2013 |

\* cited by examiner

TRACTION CONTROL DEVICE

CROSS REFERENCE TO RELATED APPLICATIONS

This application is a National Stage of International Application No. PCT/JP2013/079536 filed Oct. 31, 2013, the contents of which are incorporated herein by reference in their entirety.

TECHNICAL FIELD

The present invention relates to a vehicle traction control device preventing slip of drive wheels.

BACKGROUND ART

In the related art, there is known a traction control technology that adjusts engine output, motor output, or the like at the time of slip of drive wheels of a vehicle so as to inhibit the extent of slip of the drive wheels to predetermined value or less. One of such a traction control technology known is a technology that corrects slip by controlling output torque of an electric vehicle driving motor when slip of the drive wheels is detected (for example, PTL 1).

The traction control technology of the related art inhibits previously occurring slip by adjusting output or a driving motor or the like when slip of the drive wheels is detected. Thus, initial slip at the start of the vehicle cannot be prevented. Particularly, initial slip increases when a magnetic pickup type-wheel speed sensor is employed because a low speed of the vehicle cannot be detected. For example, when the vehicle starts on a snowy uphill road, the vehicle may not start once the drive wheels slip because compacted snow decreases a road surface coefficient of friction $\mu$.

In order to prevent initial slip at the start of the vehicle, there is suggested a device that computes the road surface coefficient of friction $\mu$ from forward and backward and leftward and rightward acceleration to compute a drive torque restriction value for the start of the vehicle on the basis of the estimated road surface coefficient of friction. $\mu$ and that inhibits a rise in the output of the driving motor when drive torque is greater than or equal to the drive torque restriction value (for example, PTL 2).

CITATION LIST

Patent Literature

PTL 1: JP-A-8-182119
PTL 2: JP-A-2006-129584

SUMMARY OF INVENTION

Technical Problem

Such a traction control device, however, poses a problem in that slip at the start of the vehicle cannot be sufficiently inhibited when, for example, vibration of the vehicle is superimposed on the forward and backward acceleration and the leftward and rightward acceleration, in which case a filter having a slow response to the acceleration has to be employed. In addition, since only the forward and backward acceleration and the leftward and rightward acceleration of the vehicle are detected, the accuracy of the road surface coefficient of friction $\mu$ is degraded when, for example, the vehicle has to start at a very low speed such as on an uphill road covered with compacted snow, in which case a problem arises in that traction operation is not stabilized, thereby leading to a failure to start the vehicle in the worst-case scenario. The invention is devised to resolve the above problems, and an object thereof is to provide a traction control device exhibiting favorable traction performance even on an uphill road covered with compacted snow.

Solution to Problem

A traction control device according to the invention includes a drive power source that outputs drive power to a drive wheel of a vehicle; a vehicle speed sensor that detects the wheel speed of a non-drive wheel of the vehicle; and target restricted speed generating means for generating a target restricted speed for the vehicle by determining the state of a road surface from target drive torque of the vehicle, the wheel speed of the non-drive wheel, and a signal indicating the extent of operation of an accelerator by a driver, in which the target restricted speed generated by the target restricted speed generating means is switched stepwise in a speed region where the speed of the drive wheel is not detected in correspondence with a control mode that is classified according to the slipperiness of a road surface.

Advantageous Effects of Invention

According to the invention, the target restricted speed generated by the target restricted speed generating means is switched stepwise by detecting the slipperiness of a road surface in a speed region where the speeds of the drive wheel and the non-drive wheel are not detected. Thus, high acceleration performance is obtained on a road surface that is not slippery, and acceleration performance on a slippery road surface is obtained depending on the driving resistance of a flat road, an uphill road, or the like as well as the status of the road surface. As a consequence, appropriately maintaining a driving speed according to the state of a road surface can secure the stability of a vehicle during driving and can maintain the appropriate state of the accelerating ability of the vehicle.

DESCRIPTION OF EMBODIMENTS

First Embodiment

Figure 1:
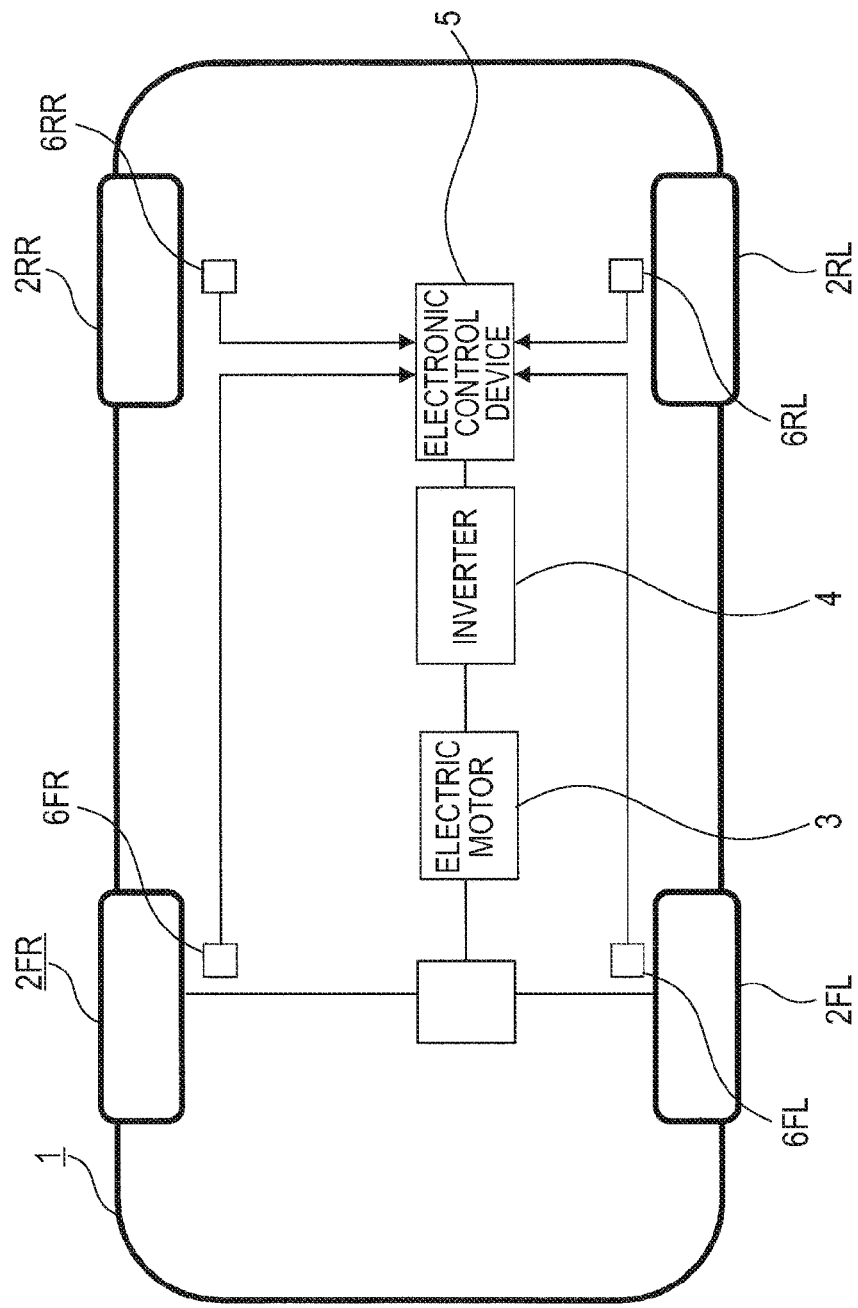
FIG. 1 is a diagram illustrating an electric vehicle 1 on which a traction control device according to a first embodiment of the present invention is mounted.

FIG. 1 is a diagram illustrating a main configuration of an electric vehicle 1 on which a traction control device according to a first embodiment of the present invention is mounted. The electric vehicle 1 includes a front left wheel 2FL and a front right wheel 2FR as driven wheels, a rear left wheel 2RL and a rear right wheel 2RR as drive wheels, an electric motor 3 outputting drive torque for driving the left and right drive wheels 2RL and 2RR, an inverter 4 supplying power to the electric motor 3, and an electronic control device 5 generally controlling operation of the electric motor 3 and the inverter 4 to control drive torque of the drive wheels 2RL and 2RR.

The electric motor 3 is an alternating current synchronous motor driven by alternating current power output from the inverter 4. The inverter 4 converts direct current power accumulated in an unillustrated high-voltage battery into alternating current power and supplies the alternating current power to the electric motor 3. The drive torque output from the electric motor 3 is transmitted to the left and right drive wheels 2RL and 2RR through a drive shaft as well as a differential gear, not illustrated, to accelerate the electric vehicle 1.

The electronic control device 5 generates target voltages for the electric motor 3 and the inverter 4 on the basis of the state of the electric vehicle 1 as well as target drive torque determined by an unillustrated driver operating an accelerator. While not illustrated, the electronic control device 5 includes therein a microprocessor performing calculations, a ROM storing programs for causing the microprocessor to execute various processes, and a RAE storing a variety of data such as an calculation result.

Figure 8:
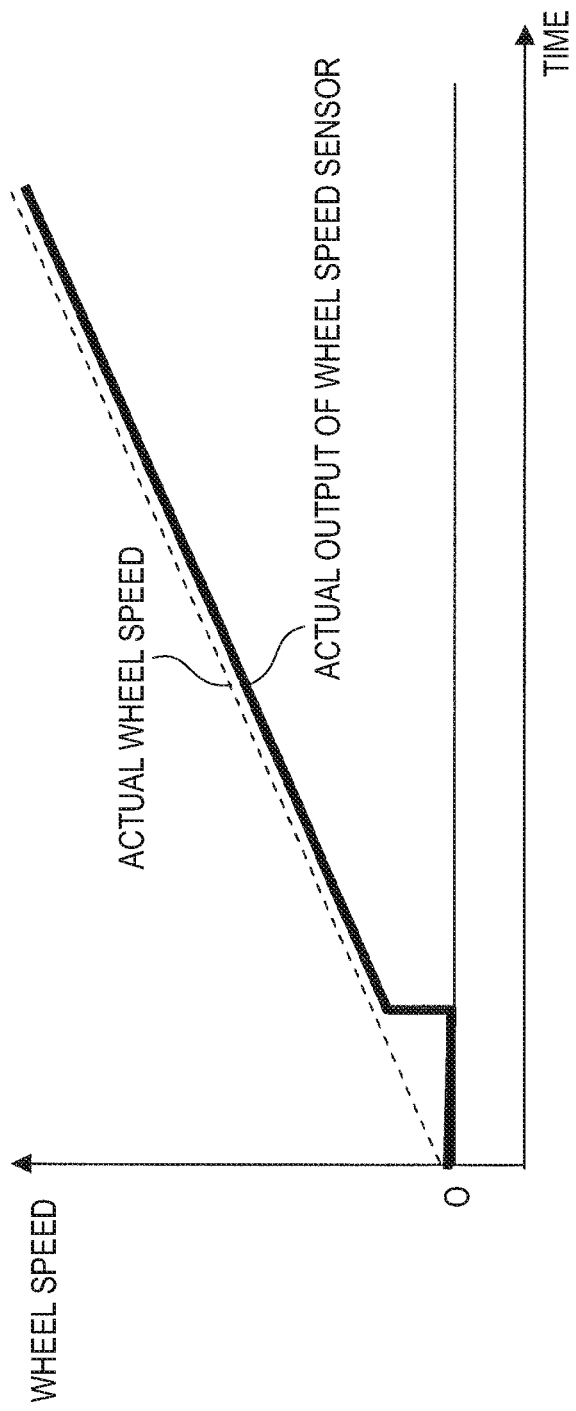
FIG. 8 is a diagram illustrating the speed of a wheel of the electric vehicle 1 employed in verifying operation of the first embodiment of the present invention.

Wheel speed sensors 6FL, 6FR, 6RL, and 6RR detecting the respective wheel speeds of the non-drive wheels 2FL and 2FR as well as the drive wheels 2RL and 2RR are connected to the electronic control device 5. A wheel speed as the output of the wheel, speed sensor is illustrated in FIG. 8. A broken line illustrates an actual wheel speed, and a solid line illustrates the output of the wheel speed sensors 6FL, 6FR, 6RL, and 6RR. The wheel speed sensor outputs zero at a low vehicle speed. Thus, the actual wheel speed is not output at a low vehicle speed.

Figure 2:
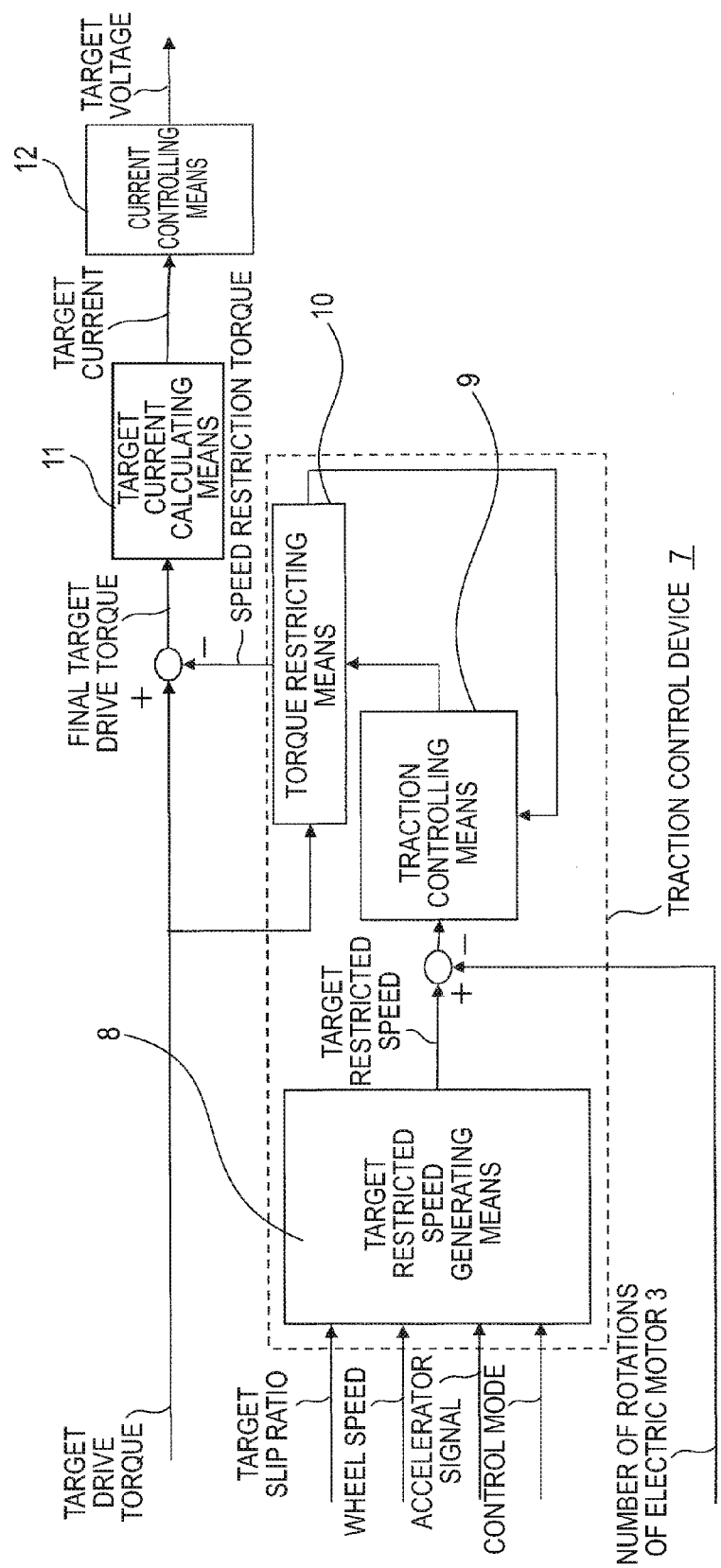
FIG. 2 is a diagram illustrating a block diagram of generating target voltages for a motor 3 and an inverter 4 according to the first embodiment of the present invention.

FIG. 2 illustrates a block diagram of generating the target voltages for the electric motor 3 and the inverter 4. Target current calculating means 11 outputs a target current for the electric motor 3 with final target drive torque as an input. Current controlling means 12 generates the target voltage for the inverter 4 following the target current from the target current calculating means 11.

When there is a rapid rise in the number of rotations of the electric motor 3 driving the drive wheels 2RL and 2RR, the final target drive torque for the target current calculating means 11 is generated by subtracting speed restriction torque output from the traction control device 7 from the target drive torque.

The speed restriction torque from the traction control device 7 is computed as follows: The number of rotations of the electric motor 3 is subtracted from a target restricted speed that is computed by target restricted speed generating means 8, described below, on the basis of a target slip ratio, a wheel speed, an accelerator signal, and a control mode, and the subtracted signal passing through traction controlling means 9 as well as torque restricting means 10 results in the speed restriction torque.

Output signals of the non-drive wheel side wheel speed sensors 6FL and 6FR are employed as the wheel speed input into the target restricted speed generating means 8. This is because the output of the drive wheel side wheel speed sensors 6RL and 6RR matches the number of motor rotations, thus not being employed in estimating the state of a road surface, that is, in detecting slip of the drive wheels. Hereinafter, the wheel speed will be employed in this meaning.

The torque restricting means 10 restricts the magnitude of the speed restriction torque so that the final target drive torque is not opposite in sign to the target drive torque. That is, the magnitude of the absolute value of the speed restriction torque is restricted to the absolute value of the target drive torque or less so as not to exceed the magnitude of the absolute value of the target drive torque.

The traction controlling means 9 employs proportional integral (PI) control in the present embodiment. When torque is restricted by the torque restricting means 10, the integral term of the proportional integral (PI) control is corrected such that the output of the traction controlling means 9 approximately matches a torque restriction value of the torque restricting means 10. The control of the traction controlling means 9 may be configured by adding derivative control or a filter to the proportional integral (PI) control.

The target restricted speed generating means 8, as described above, computes the target restricted speed on the basis of the target slip ratio, the wheel speed, the accelerator signal, and the control mode. A configuration and operation of the target restricted speed generating means 8 will be described in detail by the block diagram illustrated in FIG. 3.

When the accelerator signal exceeds a predetermined threshold, it is determined that the accelerator signal is ON, and time calculating means 13 computes an accelerator ON time. The accelerator ON time is reset to zero when either the accelerator signal is less than a predetermined threshold or a reset signal is input. The accelerator ON time is clipped when a predetermined time elapses so as not to be increased further.

A virtual vehicle speed map 14 employs the accelerator ON time output from the time calculating means 13 to output a virtual vehicle speed 1 from an array of preset numerical values as output corresponding to the accelerator ON time. A virtual acceleration map 16 outputs virtual acceleration from an array of preset numerical values corresponding to output of control mode setting means 20 described below. Virtual vehicle speed calculating means 15 employs the following equation to compute a virtual vehicle speed 2 from the accelerator ON time output from the time calculating means 13 as well as the virtual acceleration output from the virtual acceleration map 16.

$$\text{virtual vehicle speed 2} = \text{virtual acceleration} \times \text{accelerator ON time} \quad \text{(Equation 1)}$$

The virtual vehicle speed 2 is clipped when a predetermined time elapses so as not to be increased further.

Virtual vehicle speed selecting means 17 sequentially compares the virtual vehicle speed 1 and the virtual vehicle speed 2 and employs one having a greater absolute value as a final virtual vehicle speed.

$$\text{final virtual vehicle speed} = \text{MAX}(\text{virtual vehicle speed 1}, \text{virtual vehicle speed 2}) \quad \text{(Equation 2)}$$

The virtual vehicle speed 1 is provided to prevent a low μ road determination from being made erroneously when the number of motor rotations rises while the vehicle speed is zero because of a torsional deformation or the like of the unillustrated drive shaft connecting the motor and tires.

The virtual vehicle speed 2 is computed from accelerator information of a vehicle body as well as the virtual acceleration set in accordance with the control mode described below and is set in accordance with the status of a determination of the state of the road surface to a value offset by a predetermined value (a constant deviation from the number of rotations or a deviation that may change in accordance with the number of rotations) from the number of motor rotations when the vehicle body normally accelerates in accordance with the state of the road surface. This has the advantage of promptly determining the state of the road surface when the number of motor rotations rises rapidly.

Final vehicle speed selecting means 18 employs either the final virtual vehicle speed when the wheel speed is less than a threshold or the wheel speed when the wheel speed is greater than or equal to the threshold.

Target restricted speed calculating means 19 employs the following equation to compute the target restricted speed from the final vehicle speed and the target slip ratio.

$$\text{target restricted speed} = \text{final vehicle speed} + \text{final vehicle speed} \times \text{target slip ratio} \div (1 - \text{target slip ratio}) \quad \text{(Equation 3)}$$

The virtual vehicle speed 1 and the virtual vehicle speed 2 are employed to detect idle rotation of tires in a region where the wheel speed sensor does not output a value at a low speed as illustrated in FIG. 8. Since idle rotation of tires can be detected from the number of motor rotations as well as the output of the wheel speed sensor when the wheel speed sensor produces output, the final vehicle speed selecting means 18 selects either the output of the wheel speed sensor as the final vehicle speed when the wheel speed sensor produces output or the final virtual vehicle speed when the wheel speed sensor does not produce output.

Next, operation of the control mode setting means 20 setting the control mode referenced by the virtual acceleration map 16 will be described. While the control mode is classified into four states of the road surface of a high μ road, a low μ road, an uphill low μ road, and a very low μ road for illustrative purposes in the present embodiment, it can be easy to assume that the number of control modes and the number of cases in determining the control mode may be increased when finer control is desired.

FIG. 4, FIG. 5, FIG. 6, and FIG. 7 are flowcharts illustrating processing procedures of determining the control mode in the traction control device 7. The processes of FIG. 4, FIG. 5, FIG. 6, and FIG. 7 are repeatedly performed at predetermined timings in a period from a turn-on of a power supply of the electronic control device 5 until a turn-off thereof.

Figure 4:
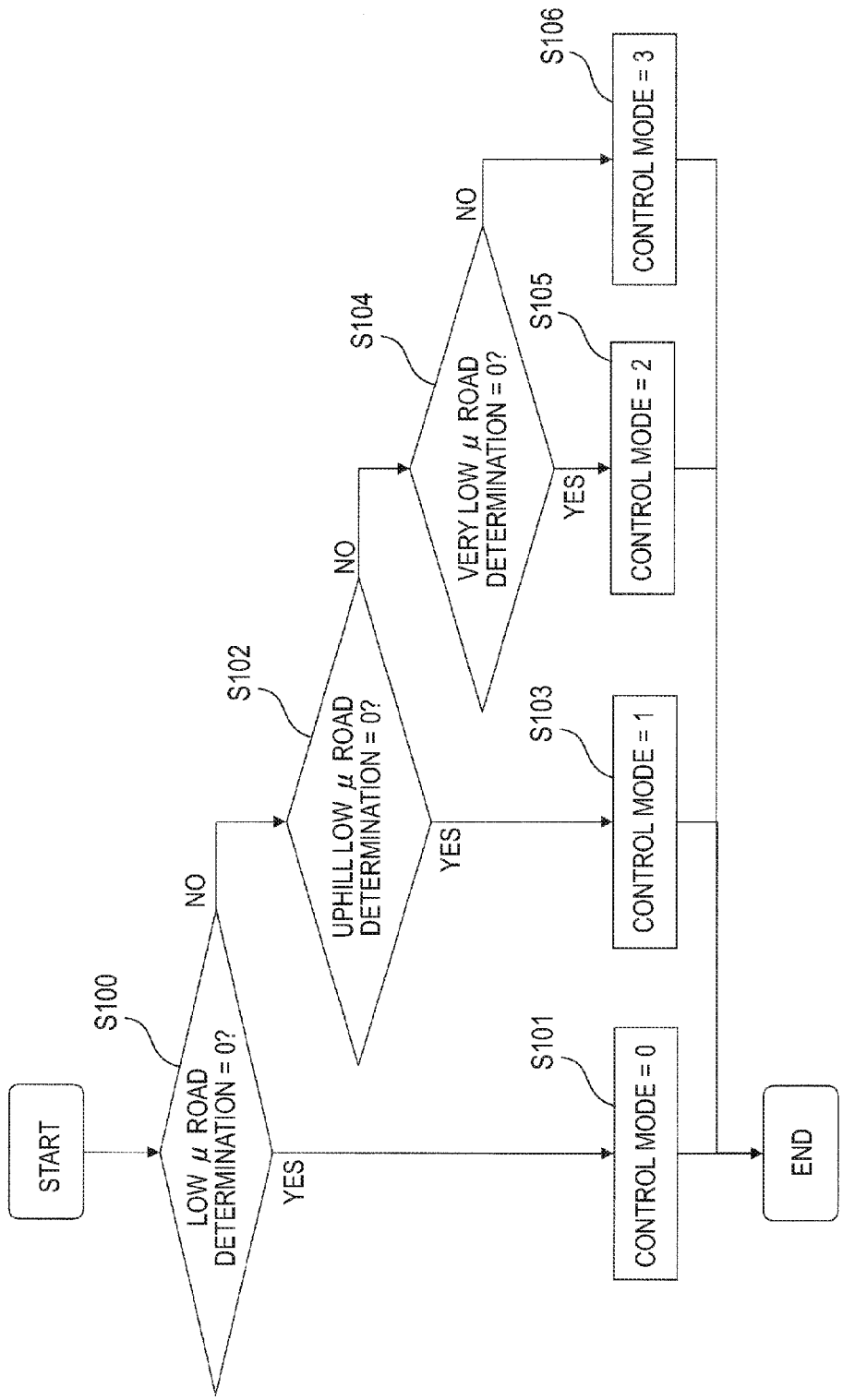
FIG. 4 is a diagram illustrating a flowchart illustrating a processing procedure of determining a control mode in a traction control device 7 according to the first embodiment of the present invention.
Figure 5:
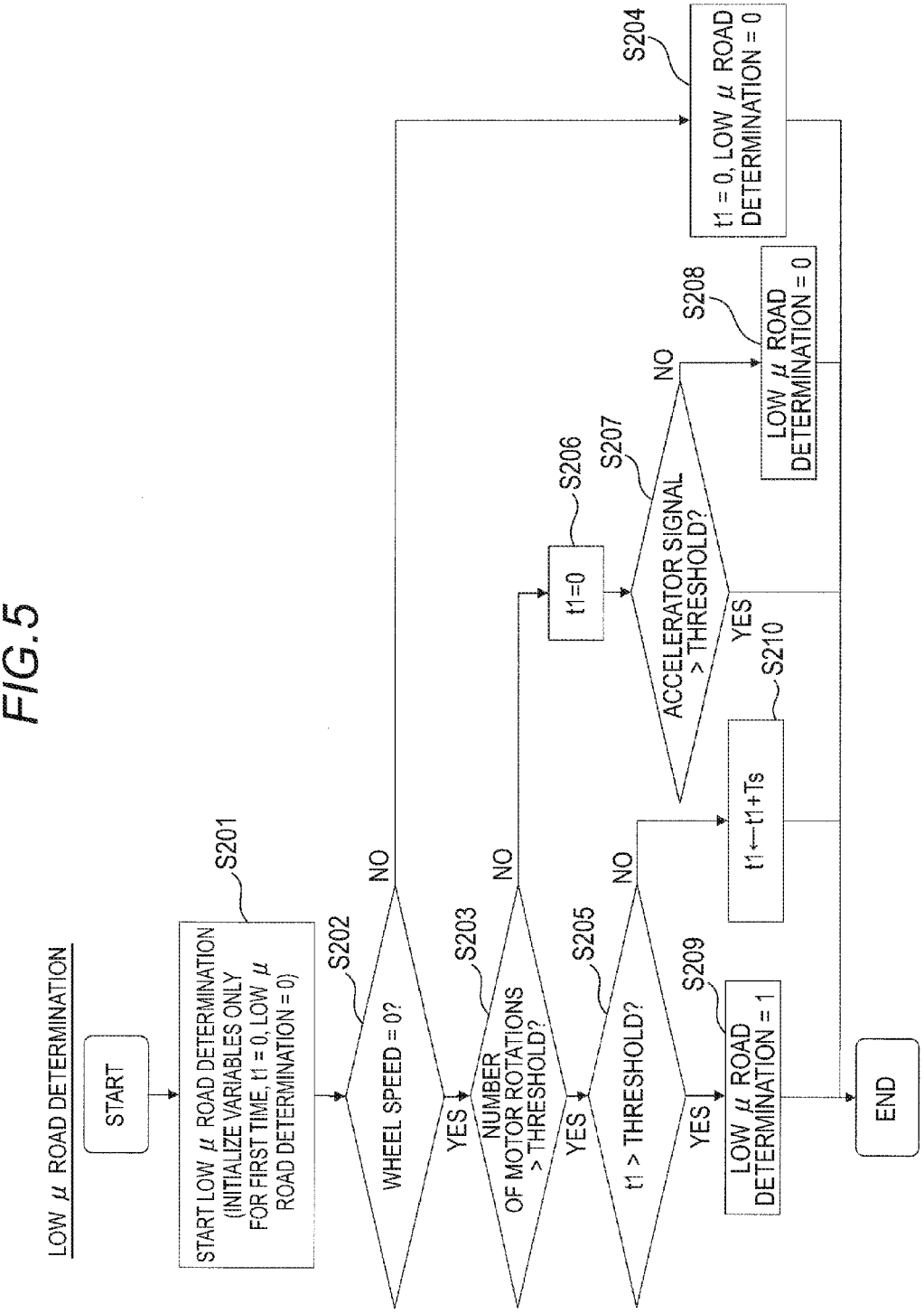
FIG. 5 is a diagram illustrating a flowchart illustrating a processing procedure when the control mode is set to a low $\mu$ road determination (control mode=1) in the traction control device 7 according to the first embodiment of the present invention.
Figure 6:
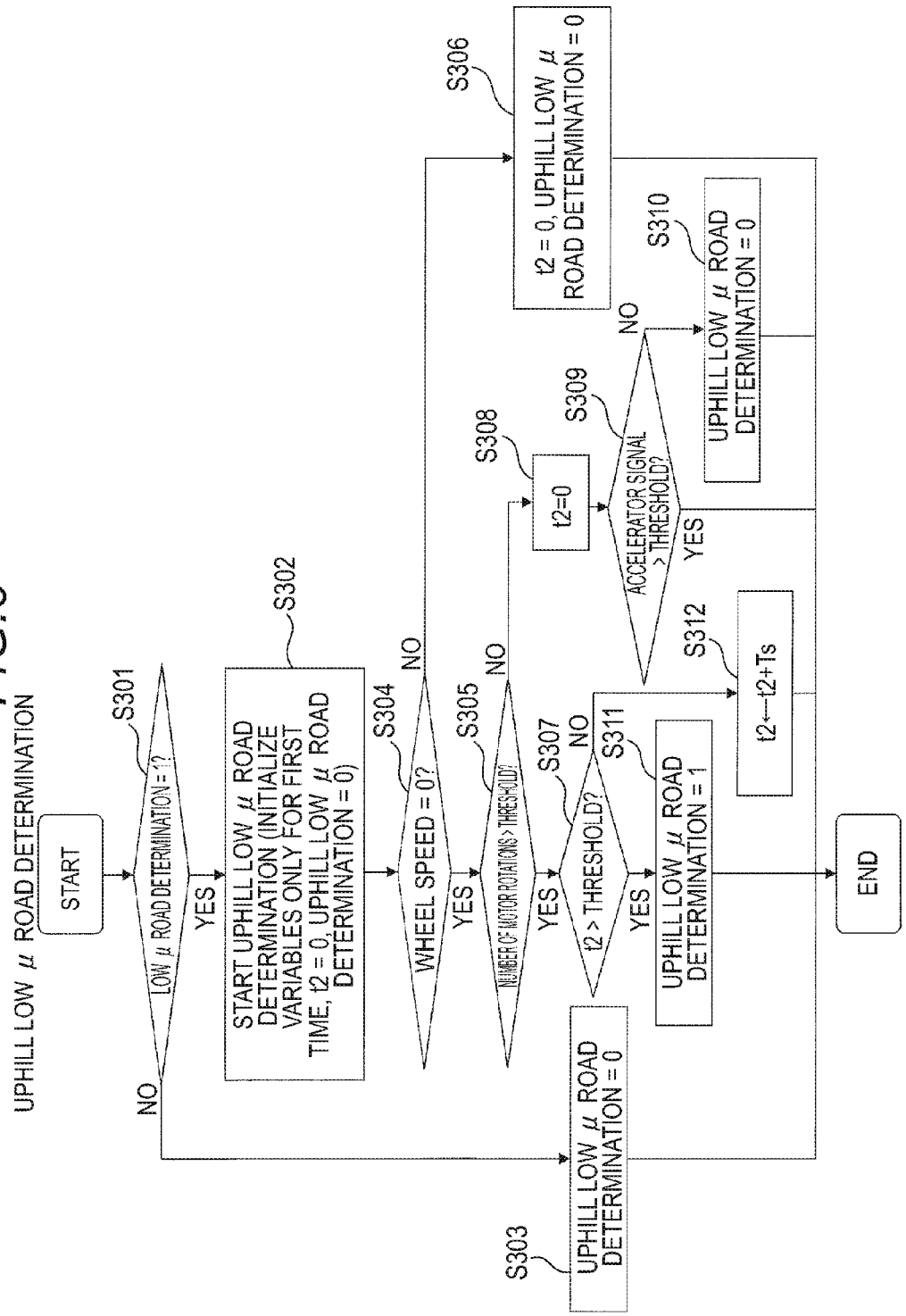
FIG. 6 is a diagram illustrating a flowchart illustrating a processing procedure when the control mode is set to an uphill low $\mu$ road determination (control mode=2) in the traction control device 7 according to the first embodiment of the present invention.
Figure 7:
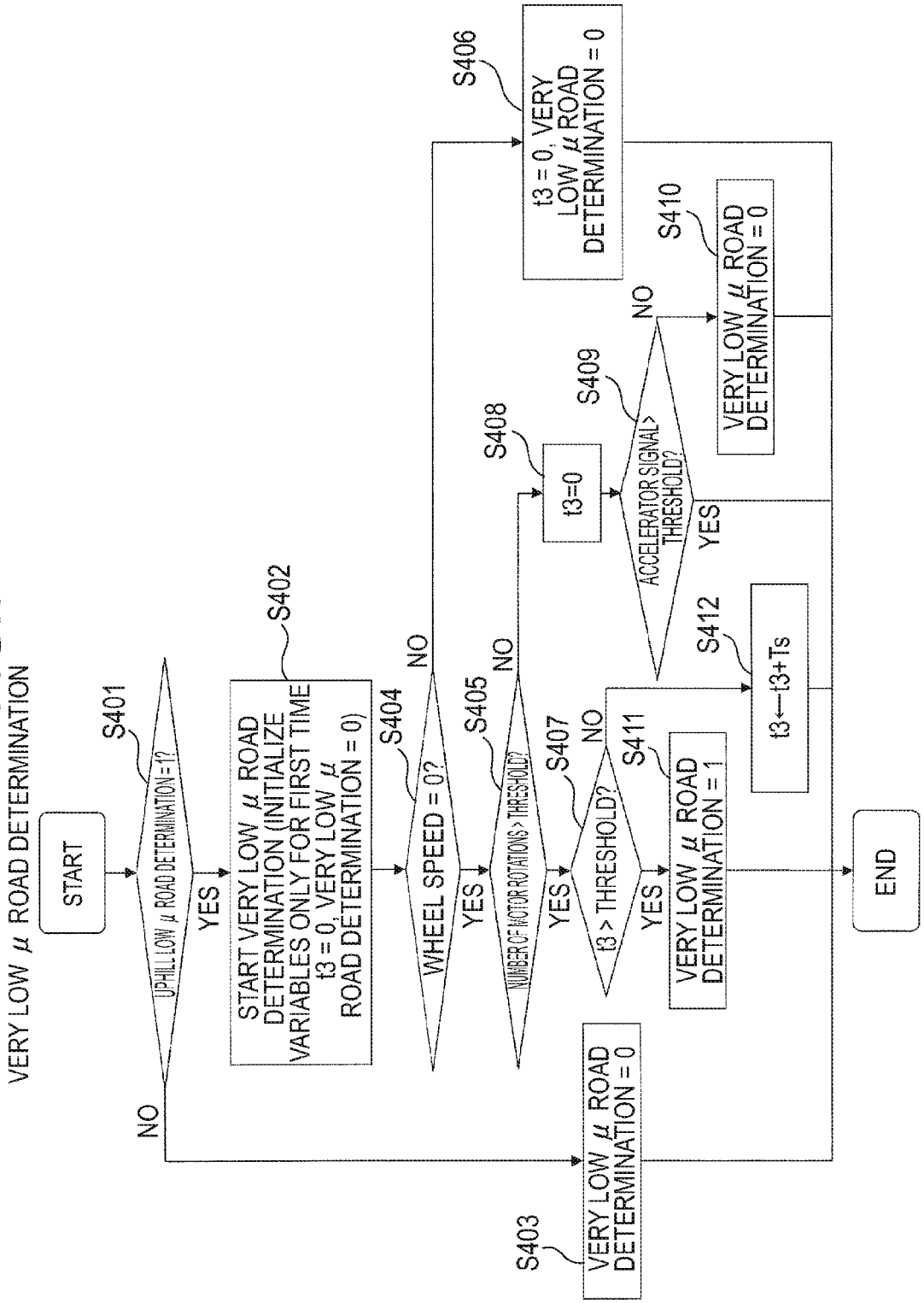
FIG. 7 is a diagram illustrating a flowchart illustrating a processing procedure when the control mode is set to a very low μ road determination (control mode=3) in the traction control device 7 according to the first embodiment of the present invention.

FIG. 4 illustrates a processing procedure of determining the control mode on the basis of processing results of a low μ road determination of FIG. 5, an uphill low μ road determination of FIG. 6, and a very low μ road determination of FIG. 7. The slipperiness of the road surface is defined as low μ road<uphill low μ road<very low μ road. In FIG. 4, FIG. 5, FIG. 6, and FIG. 7, the low μ road determination is set to either one when the determination process of FIG. 5 yields the low μ road or zero when the determination does not yield the low μ road. The uphill low μ road determination is set to either one when the determination process of FIG. 6 yields the uphill low μ road or zero when the determination does not yield the uphill low μ road. The very low μ road determination is set to either one when the determination process of FIG. 7 yields the very low μ road or zero when the determination does not yield the very low μ road.

Next, a flowchart of the control mode setting means 20 will be described with FIG. 4. The flowchart of FIG. 4 determines the control mode in order of amount of time until the wheel speed changes from the shortest, in order of the low μ road, the uphill low μ road, and the very low μ road, because the time taken until the wheel speed changes becomes shorter as the road surface is not slippery. In S100, a determination of whether the low μ road determination is zero is performed. When the low μ road determination is zero, the process transitions to S101, and the control mode is set to zero. When the low μ road determination is one, it is determined that the road surface is slippery, and the process transitions to S102. In S102, a determination of whether the uphill low μ road determination is zero is performed. When the uphill low μ road determination is zero, the process transitions to S103, and the control mode is set to one. When the uphill low μ road determination is one, it is determined that the road surface is more slippery, and the process transitions to S104. In S104, a determination of whether the very low μ road determination is zero is performed. When the very low μ road determination is zero, the process transitions to S105, and the control mode is set to two. When the very low μ road determination is one, it is determined that the road surface is more slippery. Then, the process transitions to S106, and the control mode is set to three.

Figure 3:
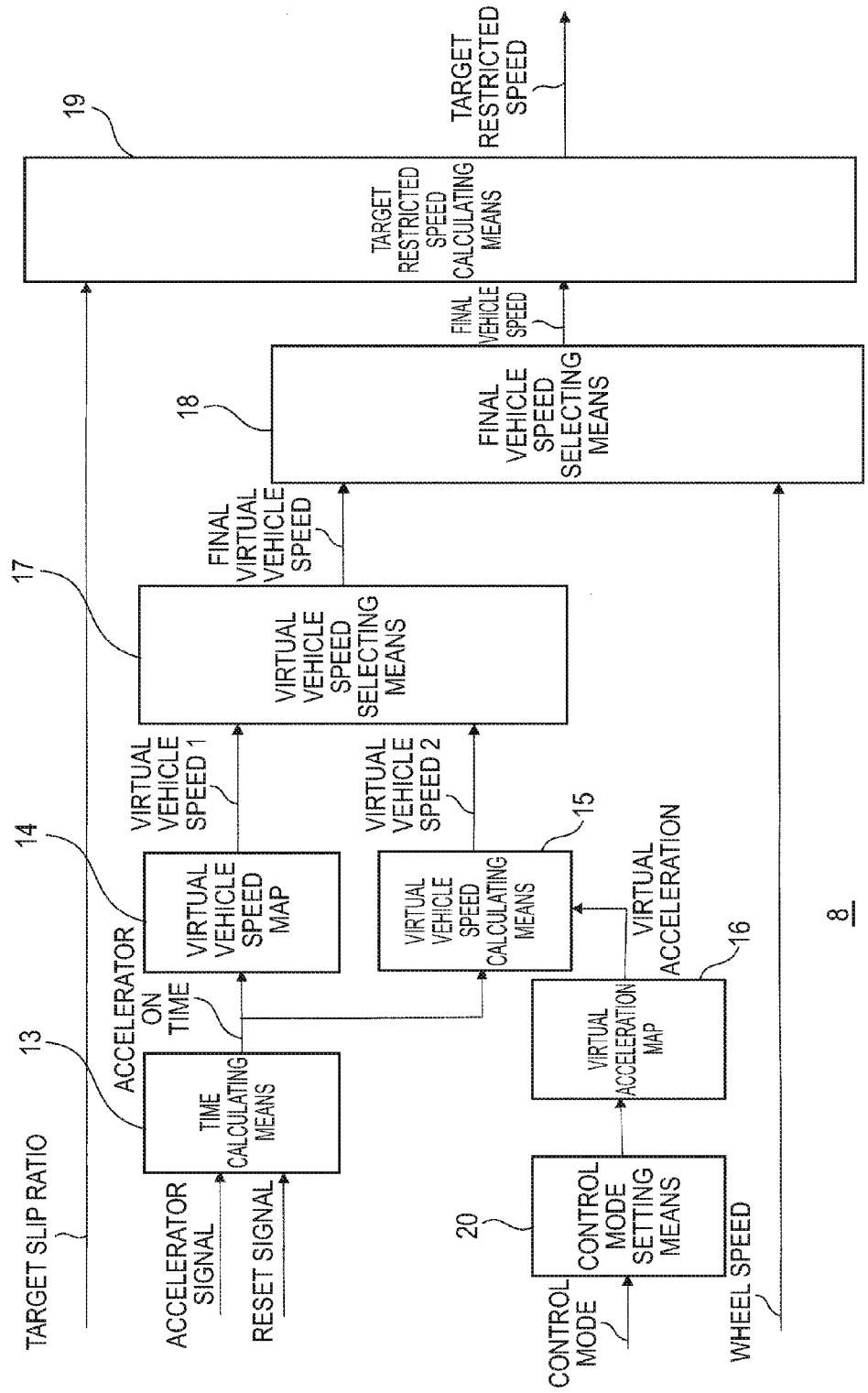
FIG. 3 is a diagram illustrating a block diagram of target restricted speed generating means 8 according to the first embodiment of the present invention.

While the virtual acceleration corresponding to the control mode is set in the virtual acceleration map 16 of FIG. 3, the magnitude of a setting value of the virtual acceleration in the present embodiment is set as high μ road (control mode=0)>low μ road (control mode=1)>uphill low μ road (control mode=2)>very low μ road (control mode=3). In so doing, it is understood that a rise in speed is inhibited in a speed region where the wheel speed is not output as the road surface is more slippery. Generally, it is known that the coefficient of friction μ between the road surface and tires decreases as the relative speed difference between the wheel speed and the number of rotations of tires increases. Thus, inhibiting a rise in speed when the state of the road surface is slippery can prevent an excessive decrease in the coefficient of friction μ between the road surface and tires.

Next, a flowchart of the low μ road determination of FIG. 5 will be described. In S201, each of a time t1 and the low μ road determination is initialized to zero for the first time after a 12 V power supply is ON. In S202, a determination of whether the wheel speed is zero is performed, and the process transitions to S203 when the wheel speed is zero. When the wheel speed is not zero, each of the time t1 and the low μ road determination is set to zero. In S203, a determination of whether the number of motor rotations exceeds a threshold is performed, and the process transitions to S205 when the number of motor rotations exceeds the threshold. When the number of motor rotations does not exceed the threshold, the process transitions to S206. In S206, the time t1 is set to zero, and the process transitions to S207. In S207, a determination of whether the accelerator signal exceeds a threshold is performed. When the accelerator signal exceeds the threshold, the low μ road determination is not set to zero. When the accelerator signal does not exceed the threshold, the process transitions to S208, and the low μ road determination is set to zero. In S205, a determination of whether the time t1 exceeds a threshold is performed. When the time t1 exceeds the threshold, the process transitions to S209, and the low μ road determination is set to one. When the time t1 does not exceed the threshold, the process transitions to S210, and a determination cycle Ts is added to the time t1.

Next, a flowchart of the uphill, low μ road determination of FIG. 6 will be described. In S301, a determination of whether the low μ road determination of FIG. 5 is one is performed. When the low μ road determination is one, the process transitions to S302. When the low μ road determination is zero, the process transitions to S303, and the uphill low μ road determination is set to zero, in which case the processes of the uphill low μ road determination of S302 and later are bypassed. In S302, each of a time t2 and the uphill low μ road determination is initialized to zero for the first time after a 12 V power supply is ON. In S304, a determination of whether the wheel speed is zero is performed, and the process transitions to S305 when the wheel speed is zero. When the wheel speed is not zero, the process transitions to S306, and each of the time t2 and the uphill low μ road determination is set to zero.

In S305, a determination of whether the number of motor rotations exceeds a threshold is performed, and the process transitions to S307 when the number of motor rotations exceeds the threshold. When the number of motor rotations does not exceed the threshold, the process transitions to S308. In S308, the time t2 is set to zero, and the process transitions to S309. In S309, a determination of whether the accelerator signal exceeds a threshold is performed. When the accelerator signal exceeds the threshold, the uphill low μ road determination is not set to zero. When the accelerator signal does not exceed the threshold, the process transitions to S310, and the uphill low μ road determination is set to zero. In S307, a determination of whether the time t2 exceeds a threshold is performed. When the time t2 exceeds the threshold, the process transitions to S311, and the uphill low μ road determination is set to one. When the time t2 does not exceed the threshold, the process transitions to S312, and the determination cycle Ts is added to the time t2.

Next, a flowchart of the very low μ road determination of FIG. 7 will be described. In S401, a determination of whether the uphill low μ road determination of FIG. 6 is one is performed. When the uphill low μ road determination is one, the process transitions to S402. When the uphill low μ road determination is zero, the process transitions to S403, and the very low μ road determination is set to zero, in which case the processes of the very low μ road determination of S402 and later are bypassed. In S402, each of a time t3 and the very low μ road determination is initialized to zero for the first time after a 12 V power supply is ON. In S404, a determination of whether the wheel speed is zero is performed, and the process transitions to S405 when the wheel speed is zero. When the wheel speed is not zero, the process transitions to S406, and each of the time t3 and the very low μ road determination is set to zero.

In S405, a determination of whether the number of motor rotations exceeds a threshold is performed, and the process transitions to S407 when the number of motor rotations exceeds the threshold. When the number of motor rotations does not exceed the threshold, the process transitions to S408. In S408, the time t3 is set to zero, and the process transitions to S409. In S409, a determination of whether the accelerator signal exceeds a threshold is performed. When the accelerator signal exceeds the threshold, the very low μ road determination is not set to zero. When the accelerator signal does not exceed the threshold, the process transitions to S410, and the very low μ road determination is set to zero. In S407, a determination of whether the time t3 exceeds a threshold is performed. When the time t3 exceeds the threshold, the process transitions to S411, and the very low μ road determination is set to one. When the time t3 does not exceed the threshold, the process transitions to S412, and the determination cycle Ts is added to the time t3.

While the slipperiness of the road surface is classified into the high μ road, the low μ road, the uphill low μ road, and the very low μ road in the first embodiment, it is assumed that the electric vehicle 1 falls into a state where a start cannot be made on the very low μ road. If the electric vehicle 1 cannot start on the very low μ road, the target restricted speed is configured by temporarily resetting the accelerator ON time to zero as well as accelerating the electric vehicle 1 again at the virtual acceleration in the control mode of three when the non-drive wheel side wheel speed does not increase even after a predetermined time elapses by counting time immediately after the low μ road determination. Each of the times t1 to t3 indicates a time at which the number of motor rotations exceeds a threshold during the accelerator is ON. The times t1 to t3 may be set to be greater than or equal to a time at which an instantaneous rise in the number of motor rotations occurring in a normal driving does not cause erroneous determination as well as to a time at which the electric vehicle 1 does not slide when slipped on an uphill road.

Figure 9:
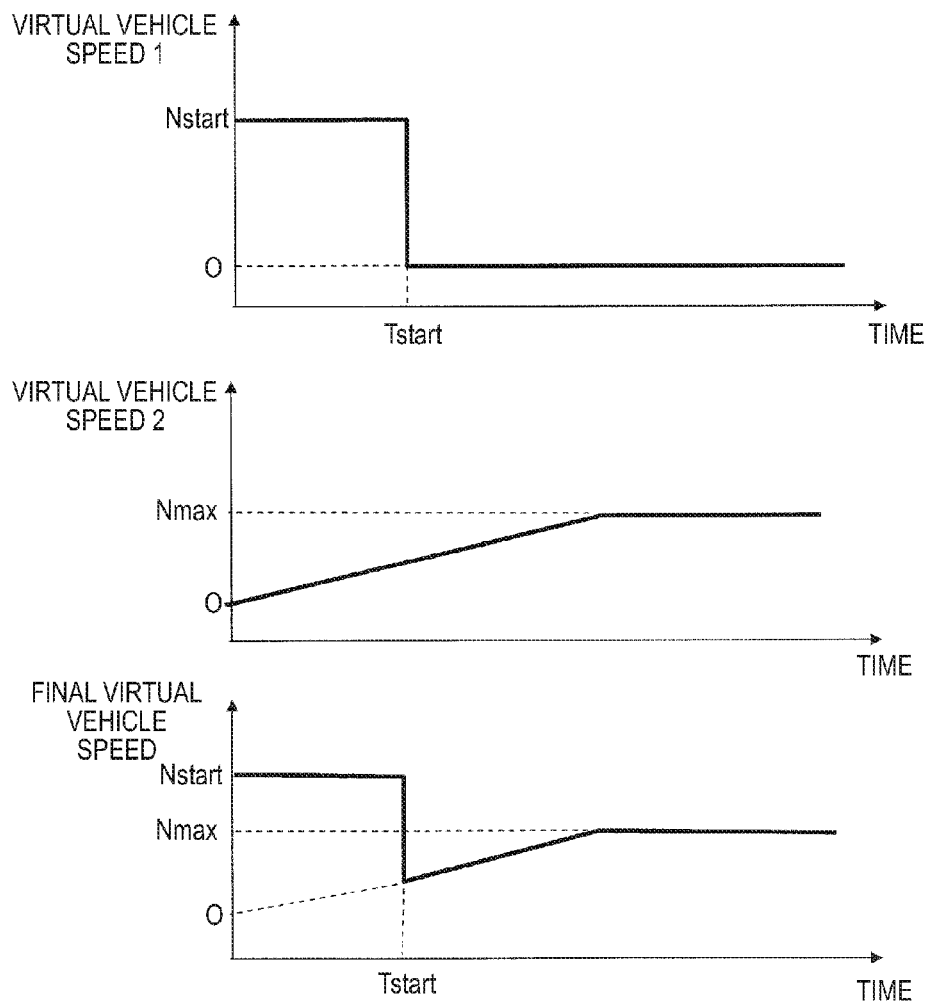
FIG. 9 is a diagram illustrating a virtual vehicle speed 1, a virtual vehicle speed 2, and a final virtual vehicle speed according to the first embodiment of the present invention.
Figure 10:
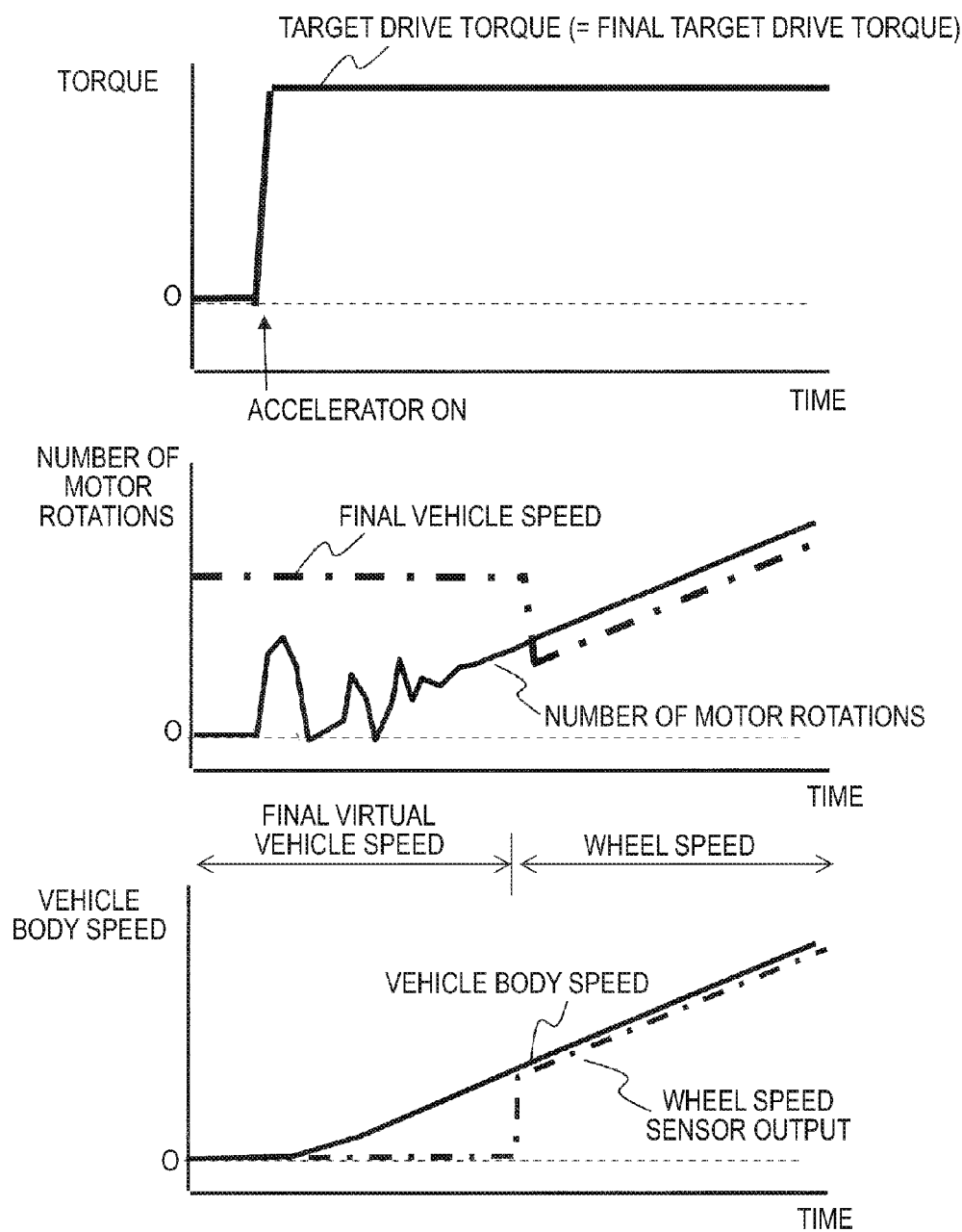
FIG. 10 is a diagram illustrating target drive torque, final target drive torque, the number of motor rotations, and a final vehicle speed at full throttle acceleration on a high μ road so as to illustrate the effect of the first embodiment of the present invention.
Figure 11:
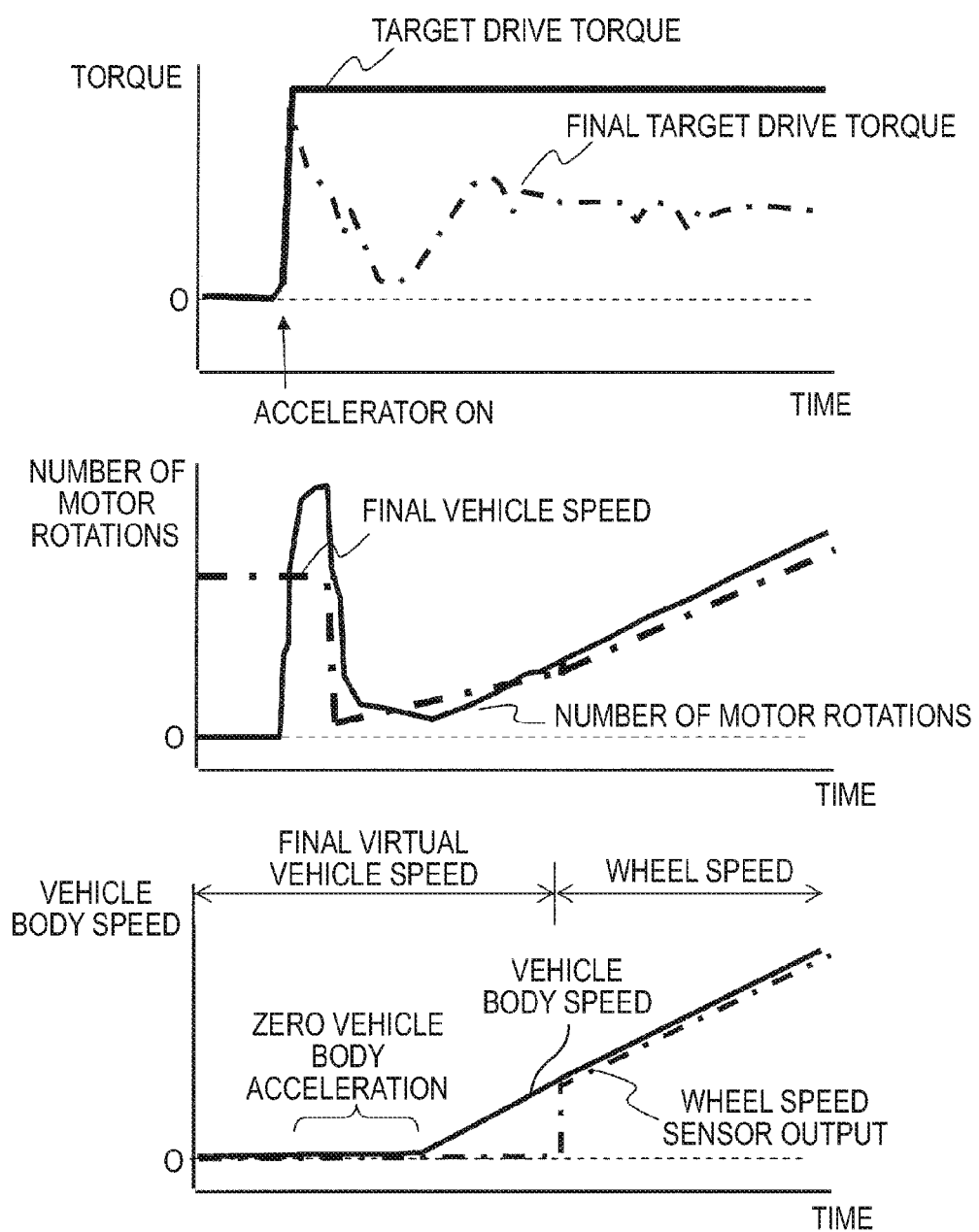
FIG. 11 is a diagram illustrating target drive torque, final target drive torque, the number of motor rotations, and a final vehicle speed at full throttle acceleration on an uphill low μ road so as to illustrate the effect of the first embodiment of the present invention.

Next, the virtual vehicle speed 1, the virtual vehicle speed 2, and the final virtual vehicle speed are set as in FIG. 9. FIG. 10 and FIG. 11 illustrate the target drive torque (final target drive torque) (refer to the upper part), the relationship between the number of motor rotations and the final vehicle speed (middle part), and the relationship between the vehicle body speed and the wheel speed sensor output (lower part) when the electric vehicle 1 starts and accelerates on the high μ road and the uphill low μ road respectively. As illustrated in FIG. 10, when the accelerator is ON on the high μ road (upper part), the number of motor rotations rises (middle part) because of a torsional deformation or the like of the unillustrated drive shaft connecting the motor and tires when the vehicle body speed is zero, and then the vehicle body accelerates (lower part).

There is a great difference between the number of motor rotations and the vehicle body speed immediately after the accelerator is ON. Thus, only in the case of the virtual vehicle speed 2 of FIG. 9, it may be determined that the wheels are slipped immediately after the start of the electric vehicle 1, thereby leading to the low μ road determination. The erroneous low μ road determination can be prevented by setting the virtual vehicle speed immediately after the accelerator is ON to be higher than the rise of the number of motor rotations due to a torsional deformation or the like of the drive shaft connecting the motor and tires employing the virtual vehicle speed 1, thus preventing degradation of feelings of the driver at the start of the electric vehicle 1. That is, it is understood from FIG. 10 that since the virtual vehicle speed 1 is set so that the number of motor rotations does not exceed the final vehicle speed, there is no decrease in target drive torque due to erroneous operation of traction control on the high μ road, and the number of motor rotations and the vehicle body speed increase smoothly.

Meanwhile, in FIG. 11, the number of motor rotations rapidly rises immediately after the accelerator is ON (middle part) when the wheel rotates idly while the accelerator is ON on the uphill low μ road, and the virtual vehicle speed exceeds the number of motor rotations. Thus, the low μ road determination is made to suppress the rise of the number of motor rotations, and the vehicle body speed increases from zero until the region where the wheel speed sensor outputs a value arrives, leading to traction control employing the wheel speed sensor. That is, during acceleration at the start of the electric vehicle 1 on the uphill low μ road in FIG. 11, a rise in the number of motor rotations due to a slip immediately after the start is suppressed, and the electric vehicle 1 accelerates at a speed of the virtual vehicle speed 2 in a slow rotation region where the wheel speed is not output. After the electric vehicle 1 accelerates to a vehicle speed at which the wheel speed is output, traction control is performed with the wheel speed.

The region of zero vehicle body acceleration illustrated in FIG. 11 may occur immediately after the start of the electric vehicle 1 on the uphill low μ road. If the technology of the related art is employed in such a case, the road surface coefficient of friction μ and the target drive torque become zero, leading to a failure to start the electric vehicle 1 in the worst-case scenario. The traction control device of the present invention controls the rotation of the motor at a low speed even if the wheel speed sensor output and the acceleration of the vehicle body are zero. Thus, excessive slip of the wheels at the start can be suppressed even on the uphill low μ road such as a snowy uphill road, and suitable acceleration performance can be obtained. Furthermore, even on an uphill road covered with compacted snow, it is possible to prevent the electric vehicle 1 from falling into a state where a start cannot be made by appropriately setting the wheel speed according to the state of the road surface.

According to the invention described thus far, the target restricted speed in the region where the speeds of the drive wheels and driven wheels cannot be detected is switched stepwise according to the slipperiness of the road surface, according to the slipperiness of the road surface in the speed region where the speeds of the drive wheels and driven wheels cannot be detected. Thus, high acceleration performance is obtained on a road that is not slippery, and acceleration performance on a slippery road surface is obtained depending on the driving resistance of a flat road, an uphill road, or the like.

According to the configuration of the first embodiment, the target restricted speed is changed by counting time immediately after the accelerator is ON. Thus, appropriate acceleration feeling can be maintained on a flat high μ road according to the state of the road surface without degrading acceleration performance immediately after the accelerator is ON. In addition, excessive slip of the wheels can be suppressed at the start of the electric vehicle 1 on a snowy uphill road.

In addition, according to the configuration of the first embodiment, either a high μ road or a low μ road is determined by whether the vehicle speed sensor outputs a signal during a time counted immediately after the accelerator is ON, and the target restricted speed is switched. Thus, favorable acceleration performance can be obtained on the low μ road without excessively decreasing the vehicle speed.

Furthermore, according to the configuration of the first embodiment, a determination of the low μ road is performed by the target restricted speed generating means in two stages or more, and the target restricted speed is switched stepwise according to each stage. Thus, suitable acceleration performance can be obtained on the low μ road such as an uphill road or on the very low μ road such as a flat road, and even on an uphill road covered with compacted snow, it is possible to prevent the electric vehicle 1 from falling into a state where a start cannot be made.

Furthermore, according to the configuration of the first embodiment, the target restricted speed is smoothly increased by counting time immediately after the low μ road determination is made. Thus, suitable acceleration performance can be obtained on the low μ road such as an uphill road or on the very low μ road such as a flat road, and even on an uphill road covered with compacted snow, it is possible to prevent the electric vehicle 1 from falling into a state where a start cannot be made.

In addition, according to the configuration of the first embodiment, the rate of temporal change in target restricted speed is set to be smaller as the stages of determination proceed. Thus, suitable acceleration performance can be obtained on the low μ road such as an uphill road or on the very low μ road such as a flat road, and even on an uphill road covered with compacted snow, it is possible to prevent the electric vehicle 1 from falling into a state were a start cannot be made.

Furthermore, according to the configuration of the first embodiment, when the electric vehicle 1 falls into a state where a start cannot be made, the target restricted speed is reset to a predetermined value if the driven side wheel speed does not increase even after a predetermined time elapses by counting time immediately after the low μ road determination is made. Thus, it is possible to prevent the electric vehicle 1 from sliding in the opposite direction to the direction of advance on the low μ road such as an uphill road.

REFERENCE SIGNS LIST

1 electric vehicle
2FL front left wheel
2FR front right wheel
2RL rear left wheel
2RR rear right wheel
3 electric motor
4 inverter
5 electronic control device
6FL wheel speed sensor for front left wheel
6FR wheel speed sensor for front right wheel
6RL wheel speed sensor for rear left wheel
6RR wheel speed sensor for rear right wheel
7 traction control device
8 target restricted speed generating means
9 traction controlling means
10 torque restricting means
11 target current calculating means
12 current controlling means 13 time calculating means
14 virtual vehicle speed map
15 virtual vehicle speed calculating means
16 virtual acceleration map
17 virtual vehicle speed selecting means
18 final vehicle speed selecting means
19 target restricted speed calculating means
20 control mode setting means

The invention claimed is:

1. A traction control device comprising:
a drive power source that outputs drive power to a drive wheel of a vehicle;
a vehicle speed sensor that detects the wheel speed of a non-drive wheel of the vehicle; and
an electronic control unit for generating a target restricted speed for the vehicle by determining the state of a road surface from target slip ratio of the vehicle, the wheel speed of the non-drive wheel, and a signal indicating the extent of operation of an accelerator by a driver,
wherein the target restricted speed generated by the electronic control unit is switched stepwise in a speed region where the speed of the drive wheel is not detected in correspondence with a control mode that is classified according to the slipperiness of a road surface.

2. The traction control device according to claim 1,
wherein the electronic control unit counts time immediately after the accelerator is ON and changes the target restricted speed according to the counted time.

3. The traction control device according to claim 2,
wherein the electronic control unit determines the slipperiness of a road surface as at least one of a high μ road and a low μ road by whether a signal is output from the vehicle speed sensor after counting time immediately after the accelerator is ON and switches the target restricted speed according to the control mode corresponding to each of the high μ road and the low μ road.

4. The traction control device according to claim 3,
wherein determination of the low μ road by the electronic control unit includes two or more stages, and the target restricted speed is switched stepwise according to each stage.

5. The traction control device according to claim 3,
wherein the target restricted speed is smoothly increased by counting time immediately after determination of the low μ road is made.

6. The traction control device according to claim 3,
wherein the rate of temporal change in target restricted speed is set to be smaller as the stages of determination proceed.

7. The traction control device according to claim 3,
wherein when the vehicle falls into a state where a start of the vehicle is not made, the target restricted speed is reset to a predetermined value if the speed of a non-drive side wheel does not increase even after a predetermined time elapses by counting time immediately after determination of the low μ road is made.

8. The traction control device according to claim 2,
wherein the electronic control unit classifies the slipperiness of a road surface into four stages of the control mode of a high μ road, a low μ road, an uphill low μ road, and a very low μ road.

9. The traction control device according to claim 8,
wherein determination of the low μ road by the electronic control unit includes two or more stages, and the target restricted speed is switched stepwise according to each stage.

10. The traction control device according to claim 8,
wherein the target restricted speed is smoothly increased by counting time immediately after determination of the low μ road is made.

11. The traction control device according to claim 8,
wherein the rate of temporal change in target restricted speed is set to be smaller as the stages of determination proceed.

12. The traction control device according to claim 8,
wherein when the vehicle falls into a state where a start of the vehicle is not made, the target restricted speed is reset to a predetermined value if the speed of a non-drive side wheel does not increase even after a predetermined time elapses by counting time immediately after determination of the low μ road is made.

* * * * *